April 17, 1951     A. SILVERMAN     2,549,644
DEVICE FOR MIXING MATERIALS
Filed Aug. 6, 1948
FIG. I.
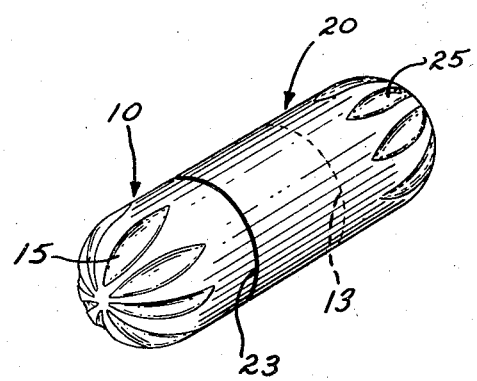
FIG. 3.
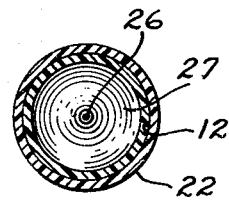
FIG. 2.
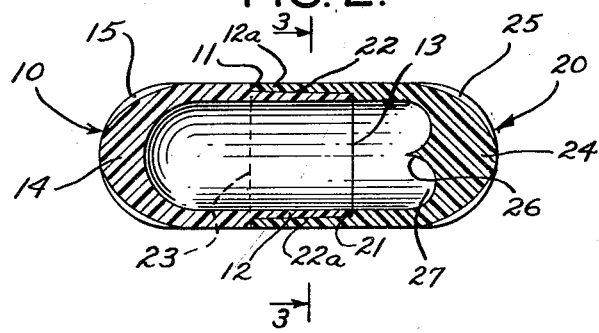
INVENTOR
ARNOLD SILVERMAN
BY
ATTORNEY Patented Apr. 17, 1951

2,549,644

UNITED STATES PATENT OFFICE 2,549,644

DEVICE FOR MIXING MATERIALS

Arnold Silverman, New York, N. Y.

Application August 6, 1948, Serial No. 42,860

1 Claim. (Cl. 259—72)

This invention relates to a device useful in the mixing of materials and, mor particularly, to a mixing vessel in which two or more substances are placed, and the vessel, after being closed, inserted in an agitating or vibrating machine.

The improved mixing vessel of this invention may be used for making a homogeneous mixture of two (or more) pulverulent or granular solids, or of two (or more) viscous liquids, or for making a semifluid homogeneous mixture of a liquid and a pulverulent or granular solid material.

The novel mixing vessel is particularly suited for mixing a liquid and a pulverulent material to form a homogeneous liquid or semifluid mass. One example would be the mixing of paint which comprises essentially a liquid carrier, usually linseed oil, and a pigment powder or powders; the resultant mixture being semi-viscous. Another example would be the mixing, by dentists and dental technicians of liquid mercury and powdered silver, to form an amalgam paste used for inlay filling. The mixing vessel in which the amalgam is prepared is in the form of a small capsule which, after being filled with the component ingredients, is placed in a motor driven agitator in which it is replaceably held between a pair of spring fingers.

In addition to the fields of uses pointed out above, the improved mixing vessel is particularly adapted for pharmaceutical needs, where there is a great variety of material to be homogeneously and thoroughly mixed.

The prime object of the invention is to provide a mixing vessel or capsule for quickly forming a homogeneous mixture of two or more component ingredients. An allied object is to provide a mixing vessel or capsule especially adapted for mixing components which are ordinarily difficult to homogeneously and intimately mix, such as a viscous liquid and a pulverulent material, or a liquid having a high surface tension such as mercury and a powder, such as silver. For convenience, the invention will be described herein with reference to a dental capsule. Accordingly, a specific object of the invention is to provide an improved dental capsule for making an inlay amalgam, which will move quickly and more thoroughly mix the powdered silver and liquid mercury.

Other objects of the invention will appear or be pointed out in the following description of the invention with reference to the accompanying drawing, wherein:

Fig. 1 is a perspective view of the improved dental capsule in closed condition;

Fig. 2 is a longitudinal section through the capsule; and

Fig. 3 is a cross-section taken on the line 3—3 of Fig. 2.

In dental capsules as heretofore made, the walls of the two halves, which are formed of plastic material, were of substantially uniform thinness. Difficulty had been encountered in such capsules because of the thinness of the material at the ends of the capsule halves: Due to the repeated impact of the heavy mercury globule as it is being rapidly thrown back-and-forth by the vibrating machine, the ends frequently developed cracks which not only destroyed the capsule but resulted in a loss of the precious contents. Another difficulty encountered in the use of the aforesaid uniform thin-wall capsules as heretofore made, was the persistent leakage of the contents, especially the liquid mercury, between telescoped tubular portions of the two halves.

These difficulties are avoided, and the objections enumerated above attained, in the improved capsule which, as clearly seen in Fig. 2, comprises two halves 10, 20. The facing tubular portions of capsule halves 10, 20 are provided with cooperative annular rabbets; the half 10 has an outer annular rabbet 11, thus leaving an inner annular lip 12, while the half 20 has an inner, annular rabbet 21, leaving an outer lip 22. The outer lip 22 of half 20 is received in the annular rabbet 11 of the other half, while the inner lip 12 of half 10 is received in the inner rabbet of half 20. In this way a tight joint is achieved between the two capsule halves. Additionally, the outer surface 12a of inner annular lip 12 and the inner surface 22a of outer annular lip 22, are made to a slight taper outwardly. That is, as clearly seen in Fig. 2, the two lips 12 and 22 are thickest where the rabbets, respectively 11 and 21 commence, and taper outwardly towards their distal ends, respectively, 13 and 23.

An additional advantage of this joint, besides that of being leak-proof, is that the annular shoulders 11, 21 provide positive stops so that when the two halves 10, 20 are forced together into abutment, the total length of the capsule will be a predetermined uniform dimension. In the ordinary uniform-wall dental capsules, there is no positive stop so that the two ends may be forced or telescoped together to various extents. The result is that such capsules when closed, are not of uniform dimension which causes difficulty in maintaining them securely and properly between the prongs or holders of the vibratory machine and defeats the assurance of a tight closure.

It will be noted, Fig. 2, that the walls of the capsule halves are not of uniform thickness as in dental capsules as heretofore made. In addition to the rabbet joint, as just described, the ends of the halves are thickened as indicated at 14, 24. Thus a maximum of strength is provided at the ends where the break-through most commonly occurs, as pointed out above.

The afore-described tapered joint is a tight one. To facilitate opening and closing of the capsule, when grasped in the fingers, the two halves are provided at their ends with a roughened surface, such as the flutes 15, 25.

The two halves may conveniently be made by plastic injection molding or by any other method, and will include all the features thus far pointed out, namely, the annular rabbets and tapered lips, the thickened ends and the incisions 15, 25. So far as these are concerned the two halves may be identical, except for the noted differences in the rabbets and lips.

An important aspect of the invention is the provision of means for facilitating the mixing operation. As shown in Fig. 2, one of the two halves, the right one 20, as shown, has an internal conical formation 26 centrally disposed, surrounded by a semi-circular annular groove 27 which merges into the central cone 26 and at the outer rim of the groove merges into the side wall of the capsule. This conical formation may be employed, if desired, on both halves (in which case the two will be identical in this respect). I prefer to employ the conical formation on but one half as shown in Fig. 2. This arrangement is conducive to a rapid and uniform mixing of the mercury liquid and silver powder. The theory underlying the efficient mixing operation of the improved capsule is not fully evident, but it may be as follows: As the globule of mercury is shuttled rightwardly, by the reciprocation of the capsule in the vibratory machine, it is broken by the conical formation into a rain or mist of very small mercury drops, thus increasing the surface area of the mercury and facilitating the mixing of the silver particles therewith. In the dental capsules as heretofore made and used, a small cylindrical block or impact hammer was placed inside the capsule together with the mercury and silver for the purpose of hastening their mixing by impacting the mercury globule against an end of the capsule. The improved capsule, with the novel conical formation, as described, obviates the need of the impact hammer and thereby achieves a number of advantageous results. In addition to speedier and more thorough mixing, there is less likelihood of breaking through the ends of the improved capsule which is a frequent occurrence in the old type of capsule with its impact hammer, due to the repeated blows of the hammer upon the ends of the capsule. Moreover, the repeated reciprocation of the hammer soon resulted in wearing down the capsule walls. This had a further deleterious effect, in that the wearing down of the capsule walls permits the contents to leak past the impact hammer, which is supposed to make a close sliding fit with the wall, and thus defeats the effectiveness of the impacts in mixing the contents. All this is obviated in the improved mixing capsule, which has no impacting hammer.

I claim:

A mixing vessel comprising an elongated cylinder consisting of companion end sections detachably connected and being circular in cross section and having a smooth inner surface and hemispherical ends, the hemispherical end of one section being internally thickened and having its inner surface semicircular in cross section and merging into the inner surface of the annular wall of the said section, and the hemispherical end of the other section also being internally thickened and formed with a conical portion located axially of the said second section and tapered to a sharp point at its apex and about its base merging into a circumferentially extending groove, the groove being arcuate in cross section and merging into the inner surface of the annular wall of the said second section.

ARNOLD SILVERMAN.

REFERENCES CITED

The following references are of record in the file of this patent:

UNITED STATES PATENTS

| Number | Name | Date |
|---|---|---|
| 1,037,272 | Lindsay | Sept. 3, 1912 |
| 1,207,703 | Basehore | Dec. 12, 1916 |
| 1,486,266 | Rosenblatt | Mar. 11, 1924 |
| 1,999,671 | Van Bree et al. | Apr. 30, 1935 |

FOREIGN PATENTS

| Number | Country | Date |
|---|---|---|
| 502,075 | Germany | July 7, 1930 |